M. O. BURNETT.
SMOKER'S STEERING WHEEL ATTACHMENT.
APPLICATION FILED MAR 21, 1921.

1,432,015.

Patented Oct. 17, 1922.

INVENTOR:
M. O. BURNETT
By Earl M. Sinclair
Atty.

Patented Oct. 17, 1922.

1,432,015

UNITED STATES PATENT OFFICE.

MILO O. BURNETT, OF MARENGO, IOWA.

SMOKER'S STEERING-WHEEL ATTACHMENT.

Application filed March 21, 1921. Serial No. 454,173.

*To all whom it may concern:*

Be it known that I, MILO O. BURNETT, a citizen of the United States of America, and resident of Marengo, Iowa County, Iowa, have invented new and useful Smokers' Steering-Wheel Attachments, of which the following is a specification.

The object of this invention is to provide an improved receptacle adapted to be attached to the steering wheel or other portion of the steering column, to receive and contain smokers' articles in convenient and accessible location for use by a person operating a motor vehicle.

A further object of this invention is to provide an improved construction for a smokers' accessory.

A further object of this invention is to provide improved means for mounting and supporting a smokers' accessory attachment.

With these and other objects in view, my invention consists in the construction, arrangement and combination of elements hereinafter set forth, pointed out in my claims and illustrated by the accompanying drawing, in which—

Figure 1:
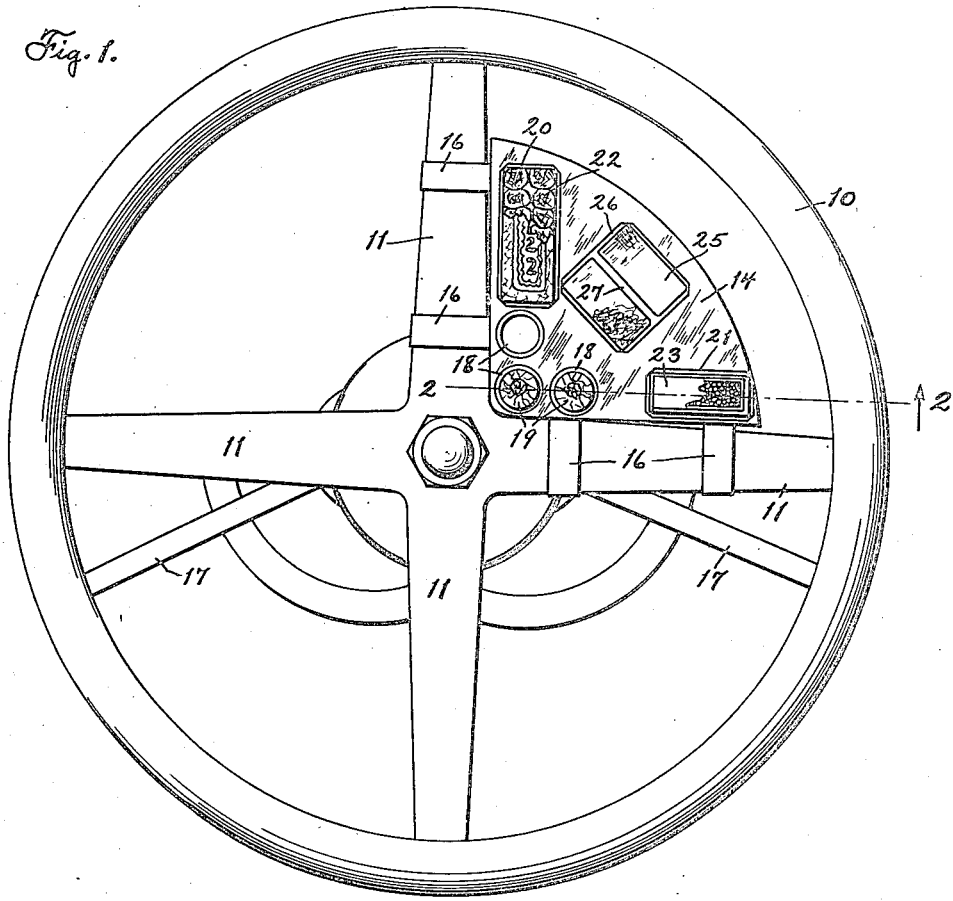
Figure 2:
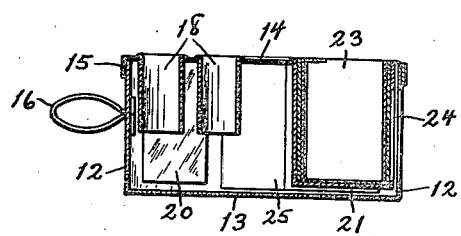

Figure 1 is a plan view showing the steering wheel of a motor vehicle with one of my attachments applied thereto in position for use. Figure 2 is a cross-section of the attachment on the line 2—2 of Figure 1.

In the drawing, a steering wheel of common form is shown, having an annular rim 10 and radiating spokes 11, which are usually four in number equally spaced. The attachment comprises a receptacle or container, preferably of segmental form adapting it to be located and substantially fill the space between two adjacent spokes 11. The receptacle comprises an irregular side wall 12 and a bottom 13 integral therewith, and is provided with a cover 14, also of segmental form and having a peripheral flange 15 adapted to frictionally engage the upper marginal portions of the side wall 12, rather snugly, to hold said cover in place. The side wall 12 preferably is formed with two substantially straight members, substantially at right angles to each other, adapted to contact side margins of adjacent spokes 11, and an arcuate member connecting said straight members, and adapted to be arranged concentric with and within a portion of the rim 10. A plurality of attaching straps or strips 16 are provided, which may be two in number for each of the straight sides of the attachment. Each strap 16 is secured at one end to the side wall 12 and is adapted to be extended around a spoke 11, through a slot in the side wall adjacent to its attached end, and bent laterally against the inner face of the side wall. This operation is readily performed while the cover 14 is removed, and provides a convenient means for attaching the device to the steering wheel and extending across the plane thereof. The device may be arranged in either direction relative to the plane of the steering wheel, in such manner as not to interfere with the operation of controlling levers such as 17 which are ordinarily carried by the steering column on one side or the other of the wheel.

The cover 14 is formed with a plurality of openings therein, which vary in size and shape and are conveniently arranged for several purposes to which they are adapted. Several of the apertures are circular and cylindrical pockets 18, open at both ends, are sealed to the margins of such openings and project inwardly of the cover, depending within the receptacle when the cover is in place. The cylindrical pockets 18 are adapted to receive and contain smokers' articles such as cigars 19, pipes or the like, the lower ends of which may rest on the bottom 13, in such manner that major portions of such articles are contained within the receptacle, and are retained against undue movement therein by rather snug fitting in the pockets 18. Others of the openings in the cover 14 are rectangular, and in some of such openings pockets 20 are mounted, extending inwardly of the cover and being closed at their lower ends and secured at their open upper ends to marginal portions of the openings. The pocket 20 is of such size and shape as to receive and contain a packet 22 of cigarettes of standard dimensions, while the pocket 21 is of such size and shape as to receive and contain a box 23 such as is ordinarily employed as a container for safety matches. The pocket 21 preferably is located adjacent one margin of the cover so that when the cover is in place said pocket depends close to the side wall 12, and said side wall is formed with a vertical slot 24 through which a match may be inserted for frictional contact with the treated portion of the box 23, for igniting the match. Portions of the box 23 may be torn away, as shown in Figure 1, to permit ready access to its contents without removal of the box from the pocket, or of the members of the box from each other. Another of the openings in the cover 14 is adapted to receive loosely an ash tray 25, open at its top and closed at its bottom. The tray 25 is formed at its upper end with a peripheral flange 26 adapted to engage the cover 14 marginally of the opening, to support said tray removably and replaceably relative to the cover and within the receptacle. The tray 26 preferably is formed with a crossbar 27 at its top, adapted to be engaged by a cigar or cigarette to remove the ash therefrom and permit it to fall within the the tray, and also adapted to be used as a handle in removing, emptying and replacing the tray.

The attachment provides convenient and accessible means for containing articles used by smokers, in such manner that they may be readily and easily used by a person who is engaged in operating the vehicle, and whose hands are employed in the driving operations.

I do not desire to be understood as limiting myself to the precise shape, construction and arrangement of parts herein shown and described, as various modifications thereof may be employed, within the scope of the appended claims, without departing from the spirit of my invention. For instance the receptacle and cover may be so shaped as to fit and partially embrace the steering column, and other suitable fastening means may be employed to suit such arrangement and location.

I claim as my invention—

1. A smokers' attachment, comprising a receptacle, a cover therefor, said cover carrying a plurality of depending pockets adapted to lie wholly within the receptacle and to receive and contain various smokers' articles, one of said pockets being an ash tray removably and replaceably carried by said cover, said cover extending throughout the entire area of the receptacle extraneous to the pockets.

2. A smokers' attachment, comprising a receptacle, loops extending laterally from and wholly between the top and bottom of said receptacle, said loops being adapted to embrace spokes of a steering wheel, said receptacle being formed with assorted pockets opening to its upper surface and adapted to contain various smokers' articles, one of said pockets being adapted to contain snugly a packet of safety matches, said receptacle being formed with a slot in its side wall through which a match may be inserted for contact with the treated portion of the match box so contained.

3. As a new article of manufacture, a receptacle having a bottom and side walls rising therefrom, two of said side walls being arranged at an angle to each other and adapted to contact and be secured to opposed faces of adjacent spokes of a vehicle steering wheel, a third side wall being arranged to connect said two side walls adjacent to a portion of the rim of said steering wheel, and a cover for said receptacle adapted to be removably and replaceably mounted on upper margins of said side walls, said cover being formed with openings and with depending pockets in said openings, which pockets are adapted to contain various smokers' accessories.

4. As a new article of manufacture, a receptacle having a bottom of segmental form and side walls rising therefrom, two of said side walls intersecting substantially at right angles supporting means carried by said walls, a third side wall being arcuate and connecting outer ends of the two side walls, and a cover for said receptacle adapted to be removably and replaceably mounted on upper margins of said side walls, said cover being formed with openings adapted to receive assorted pockets.

Signed at Marengo, in the county of Iowa and State of Iowa, this 4th day of March, 1921.

MILO O. BURNETT.